United States Patent [19]

Mansbridge et al.

[11] Patent Number: 5,603,449
[45] Date of Patent: Feb. 18, 1997

[54] FORMING OF DIFFUSION BONDED JOINTS IN SUPERPLASTICALLY FORMED METAL STRUCTURES

[75] Inventors: Martin H. Mansbridge; David J. Irwin, both of Bristol, Great Britain

[73] Assignee: British Aerospace Public Limited Company, Farnborough, England

[21] Appl. No.: 411,930

[22] Filed: Mar. 28, 1995

Related U.S. Application Data

[63] Continuation of Ser. No. 163,800, Dec. 9, 1993, abandoned.

[30] Foreign Application Priority Data

Dec. 9, 1992 [GB] United Kingdom ............. 92 25 702.1

[51] Int. Cl.[6] .......................... B23K 20/00; B23K 31/00
[52] U.S. Cl. ........................ 228/157; 228/190; 228/265
[58] Field of Search .................................. 228/157, 265, 228/155, 190, 175; 29/421.1, 897.31, 897.312

[56] References Cited

U.S. PATENT DOCUMENTS

| | | | |
|---|---|---|---|
| 4,043,498 | 8/1977 | Conn, Jr. .................................. | 228/157 |
| 4,632,296 | 12/1986 | Mansbridge et al. ................... | 228/157 |
| 4,642,863 | 2/1987 | Schulz ..................................... | 228/157 |
| 4,919,323 | 4/1990 | Mahoney et al. ....................... | 228/157 |
| 5,055,143 | 10/1991 | Runyan et al. ......................... | 228/157 |
| 5,118,026 | 6/1992 | Stacher .................................... | 228/157 |
| 5,204,161 | 4/1993 | Pettit et al. ............................. | 228/157 |

FOREIGN PATENT DOCUMENTS

| | | |
|---|---|---|
| 910249 | 11/1962 | United Kingdom . |
| 1102437 | 2/1968 | United Kingdom . |

*Primary Examiner*—Samuel M. Heinrich
*Attorney, Agent, or Firm*—Cushman, Darby & Cushman

[57] ABSTRACT

A method of forming a diffusion bonded joint during superplastic forming of a hollow metal structure (43) from sheet material (15, 16, 17, 18) using a two-piece die (1) having opposed clenching faces (9, 10) disposed along a split line (2) thereof, the structure 43 being formed with a joint at the split line, the method including placing the sheets (15, 16, 17, 18) between the faces (9, 10) clenching the sheets with a pressure sufficient to locate same during superplastic forming while being insufficient to deform the metal and prevent superplastic flow in the sheets between the clenching faces (9, 10), heating the sheets to a superplastic forming temperature and applying a gas pressure between the sheets to commence superplastic forming, when superplastic metal flow between the clenching faces substantially ceases upset forging metal from between the faces towards the interior of the die to increase wall thickness at the joint upon trimming off a flange formed by that part of the sheets trapped between the clenching faces. A die to carry out the above method, a die and sheet assembly and a structure manufactured according to the method are also provided.

7 Claims, 2 Drawing Sheets

FORMING OF DIFFUSION BONDED JOINTS IN SUPERPLASTICALLY FORMED METAL STRUCTURES

This is a continuation of application Ser. No. 08/163,800, filed on Dec. 9, 1993, which was abandoned upon the filing hereof.

BACKGROUND TO THE INVENTION

This invention relates to forming of diffusion bonded joints in superplastically formed hollow metal structures and in particular to the joint integrity of peripheral diffusion bonded joints between adjacent sheets of material following removal of an external flange from the region of the joint.

The term 'superplastic forming' used in this specification refers to characteristics exhibited by a known class of metallic alloys which have a composition and microstructure such that when heated to within an appropriate temperature range and deformed within an appropriate range of strain rate, the metal takes on the flow characteristics of a plastic material, that is to say it has the flow characteristics of a viscous fluid. With such metallic alloys, large deformations are possible without fracture. The term 'diffusion bonding' used in this specification refers to a process which forms a metallurgical bond by the application of heat and pressure to metal pieces held in close contact for a given length of time.

DESCRIPTION OF THE PRIOR ART

In known superplastic forming and diffusion bonding operations, a hollow structure is formed from two, or more, usually four, initially flat or sculpted sheets clamped together between opposite halves of a die. Injection of a pressurised inert gas between the sheets when in the die blows the sheets out to take up the form of the die (and in the inner sheets to form a reinforcing core) and thus form a hollow structure. It is necessary during this blowing operation, when superplastic forming of the metal takes place, for clenching faces disposed along the split line of the die to clench the sheets of metal together to form a gas-tight seal therebetween. This clenching force also has the effect of diffusion bonding the sheets to one another as a flange to form a unitary structure.

Joint integrity for this peripheral flange joint is at present compromised if the flange needs to be removed to form a flush joint. This is because sheet thinning which occurs as the metal is super-plastically drawn around each corner separating a clenching face from its adjoining inner surface of the die, can drive the line of separation of the sheets outwardly of the structure to a position outside the outer surface of the walls thereof. This means that trimming off the flange can actually separate the two halves of the structure along the joint line.

It has been proposed in U.S. Pat. No. 5,055,143, McDonnell Douglas to alleviate this problem by inserting at least one "doubler" between sheets in the peripheral joint to fill up this gap which is formed between the sheets during the superplastic forming operation. This process however necessitates the careful positioning of such a doubler or doublers in the joint region and inevitably leads to complication of the manufacturing process and additional material costs.

OBJECT OF THE INVENTION

It is an object of the invention to provide a method of forming a diffusion bonded joint during a superplastic forming process as aforesaid which overcomes the disadvantages of the prior art.

SUMMARY OF THE INVENTION

According to a first aspect of the present invention there is provided a method of forming a diffusion bonded joint during superplastic forming of a hollow metal structure from sheet material using a two piece die having opposed clenching faces disposed along a split line thereof, the structure being formed with a joint at the split line, the method including the steps of:

placing at least two metal sheets between the faces;

clenching the sheets with a pressure sufficient to locate same during superplastic forming thereof while being insufficient to deform the metal whereby significantly to restrict superplastic flow in the sheets between the clenching faces;

heating the sheets to a temperature to allow superplastic forming and diffusion bonding to take place;

applying a gas pressure between the sheets whereby to commence superplastic forming thereof to the shape of the die;

upon substantial cessation of superplastic metal flow between the clenching faces, increasing the pressure on the sheets via the clenching faces to upset forge metal from between the faces in a direction toward the interior of the die and thus increase wall thickness of the structure in said direction at the joint.

The method of the invention thus enables superplastic metal flow to occur within the sheets between the clenching faces during superplastic forming of the structure and therefore allows the maximum possible amount of metal flow into the die cavity.

At least four sheets may be placed between the clenching faces of the die in which two outer sheets may be superplastically formed into direct contact with internal surfaces of the die and at least two inner sheets may be superplastically formed into a core of the metal structure.

The increase in pressure on the sheets may be applied when sheets which come into direct contact with the internal die surfaces have contacted same in the region of the split line. This contact will prevent or severely reduce any further superplastic extension of the sheet material in that region.

When four sheets are being superplastically formed, the increase in pressure on the sheets may be applied when the two outer sheets have substantially completed superplastic deformation to the shape of the die.

When at approximately 927 degrees C. the pressure sufficient to locate the sheets during superplastic forming thereof may be substantially 1,000 lb per square inch (70.3 kgf/cm$^2$) and the pressure increase on the sheets via the clenching faces may be to substantially 1,500 lb per square inch (105.5 kgf/cm2) to upset forge the metal. A temperature range between 810 degrees C. and 930 degrees C. is suitable for superplastic forming.

The step of increasing pressure on the sheets via the clenching faces to upset forge the metal may comprise bringing the clenching faces closer together until limit stops are reached, to ensure consistency of geometry of the formed structure.

The upset forging step may be carried out by bringing together said clenching faces, at least one of which has at least a portion thereof tapered or angled away from the other in the direction of the die interior.

During the step of placing at least two metal sheets to be formed between the clenching faces of the die, at least one of the sheets placed may comprise a relatively thicker region in the vicinity of the clenching faces and at least one relatively thinner region elsewhere. This relatively thicker region may extend a substantial distance from the vicinity of the clenching faces and may cover a whole wall section adjacent the clenching faces. This relatively thicker section ensures sufficient metal to be upset forged is present between the clenching faces for a given design of structure.

According to a second aspect of the present invention there is provided a two-piece die for super-plastically forming and diffusion bonding a hollow metal structure from at least two sheets of metal, the die having opposed clenching faces disposed along a split line thereof for forming a peripheral flange joint of the structure by diffusion bonding, wherein the die includes means for applying a first pressure to the sheets via the clenching faces sufficient to locate the sheets whilst allowing superplastic metal flow in the sheets between the faces, means to apply a higher forging pressure to the sheets at a pre-determined time in the forming cycle and means to direct metal upset forged from between the faces towards the interior of the die.

The means to direct the upset forged metal may comprise a taper applied to at least part of at least one clenching face. Both clenching faces are preferably tapered and may be tapered at an included angle of between 5 degrees and 30 degrees, preferably substantially 10 degrees.

The at least one tapered clenching face preferably includes a non tapered portion adapted to contact the sheet before the tapered part thereof. This non tapered portion, or 'flat' is dimensioned so as to make a shallow indentation in the sheet material to 'nip' same and prevent slippage thereof. The adjacent tapered part however, allows clenching movement of the clenching face to cease when the area of clenching face applied to the sheet reaches a predetermined level.

According to a third aspect of the invention there is provided a die and sheet metal assembly for superplastically forming and diffusion bonding a hollow structure comprising a two-piece die according to the second aspect of the invention and at least two metal sheets placed between the clenching faces of the die, at least one sheet having a relatively thicker region in the vicinity of the clenching faces and at least one relatively thinner region elsewhere.

According to a fourth aspect of the invention there is provided a hollow metal structure when manufactured according to the method of the first aspect of the invention.

BRIEF DESCRIPTION OF THE DRAWINGS

The invention will now be described by way of example with reference to the accompanying drawings of which.

DESCRIPTION OF PREFERRED EMBODIMENT

Figure 1:
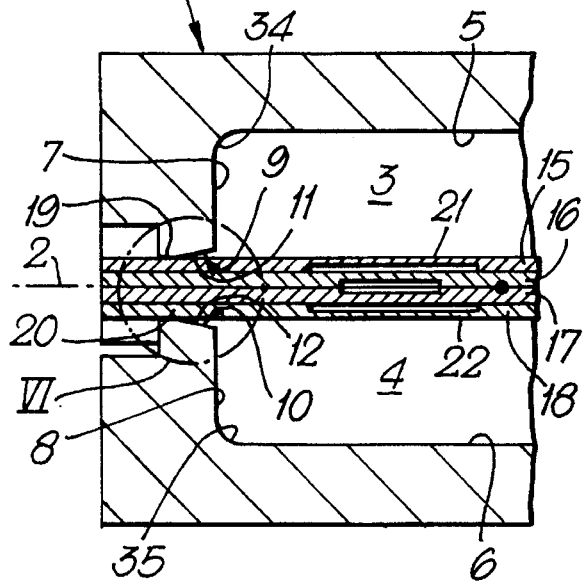
FIG. 1 is a vertical sectional view through a die according to the invention showing four sheets of titanium in position ready for superplastic forming to begin.

Referring to FIGS. 1 to 4 and 6, a two-piece die 1 is shown having a split line at 2. The die 1 is hollow having an internal cavity split into an upper cavity 3 and a lower cavity 4. These cavities are bounded by upper and lower inner walls 5, 6 respectively and end walls 7, 8 which lie adjacent upper and lower tapered clenching faces 9, 10 which surround the cavities 3 and 4. Die corners 34, 35 join inner walls 5, 7 and 6, 8 respectively. Each clenching face 9, 10 is tapered away from the other, in the direction of the interior of the die 1 (and in the direction of the interior of a structure to be formed), across tapered portions 11, 12. Each clenching face 9 and 10 also consists of a small flat portion 13, 14.

Clenched between the clenching faces 9, 10 are four pre-sculpted titanium sheets 15, 16, 17, 18. Each sheet is sculpted by known chemical etching methods not further described here. The reason for the pre-sculpting of each sheet is to assist superplastic forming of each sheet to its desired structural shape within the die. Sheets 15 and 18 have relatively thicker regions 19, 20 respectively in the vicinity of the clenching faces 9, 10 and have relatively thinner regions 21, 22 respectively spaced from the clenching faces 9, 10 and positioned to lie along upper and lower inner walls 5, 6 respectively when formed. Inner sheets 16, 17 are known as "core sheets" because they are formed later in the superplastic forming cycle into a reinforcing core for a structure 43 (see FIG. 4 and FIG. 5).

Although flat sheets can be used for certain design requirements, core sheets 16, 17 each have relatively thicker regions 24, 25 in the vicinity of the clenching faces 9, 10, relatively thinner regions 26, 27 spaced from the clenching faces 9, 10 and second relatively thicker regions 28, 29 welded together at 30. The weld 30 keeps the core sheets 16, 17 in contact throughout and enables the superplastic formation of an inner structural wall 31 automatically.

The tapered portions 11, 12 of the upper and lower clenching faces 9, 10 and the upper and lower end inner walls 7, 8 of the die define corners 32, 33 at intersections thereof. Upper and lower outer sheets 15, 18 are drawn around these corners 32, 33 during the superplastic forming process.

Inert gas is introduced between sheets 15, 16 and 17, 18 at the same time and pressure and later between core sheets 16 and 17 by nozzles inserted between the sheets (not shown).

In operation, and referring to FIG. 1, the die 1 is opened and the four sheets 15, 16, 17, 18 are laid on the lower clenching face 10. The upper clenching face 9 is then brought down to contact the uppermost sheet 15, the nozzles being inserted between the sheets before placing in the die. The assembly of die 1 and sheets 15, 16, 17, 18 is then placed in an oven to raise it to a temperature at which superplastic forming can take place, approximately 1700 degrees Fahrenheit (927 degrees Celcius).

Figure 2:
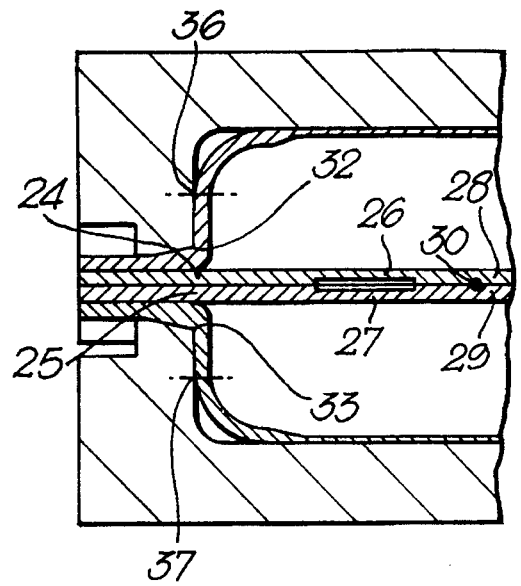
FIG. 2 shows the arrangement of FIG. 1 when the outer shees have been superplastically formed into contact with die surfaces adjacent to clenching faces of the die.

Referring now to FIG. 2, a clench load is applied to the sheets by the clenching faces 9, 10 of approximately 1,000 lbs per square inch with the tool at 927 degrees C. This pressure is enough to "nip" the upper and lower sheets 15, 16 to locate same during superplastic forming but is insufficient substantially to deform the sheets which would restrict superplastic flow of metal along each sheet between the clenching faces during the superplastic forming operation. Inert gas is now introduced between sheets 15, 16 and 17, 18 at the same time and pressure to blow the sheets 15 and 18 progressively to the shape of the die. When the sheets 15, 18 reach the position shown in FIG. 2 with the relatively thicker regions 19 and 20 contacting the upper and lower end inner walls 7, 8, substantially no further superplastic flow of metal will occur along the sheets 15, 18 between the clenching faces 9, 10 because the contact area of each sheet with its respective inner wall 7, 8 will substantially stop further superplastic stretching of the sheets as far as points 36, 37 from the clenching faces 9 and 10. At this time it is possible to bring the clenching faces 9, 10 closer together (as shown in FIG. 4) to increase the pressure on the sheets 15, 16, 17 and 18 to forging pressure to begin upset forging of metal into the die. However, in this example, upset forging is not commenced until sheets 15 and 18 have been fully superplastically formed to the shape of the die, as shown in FIG. 3.

Figure 3:
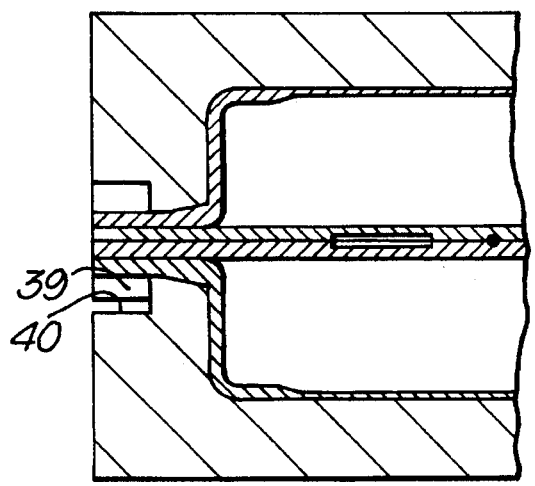
FIG. 3 shows the arrangement when the outer sheets have been fully formed to the shape of the die.
Figure 4:
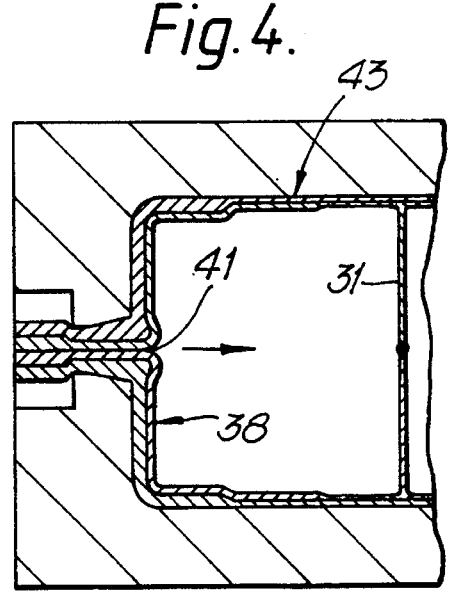
FIG. 4 shows the same arrangement with four sheets blown into their final shape.

When the stage shown in FIG. 3 has been reached, inert gas is introduced between sheets 16 and 17 to blow them apart to form a core 38, as shown in FIG. 4. At the same time as the gas pressure is introduced between sheets 16 and 17, the clenching faces 9 and 10 are moved closer together until limit stop 39 engages surface 40. Metal from all four sheets 15, 16, 17, 18 is upset forged in the direction of the arrow (see FIG. 4) owing to the urging effect of each tapered portion 11, 12. This has the effect of moving a line of separation 41 of sheets 16 and 17 inwardly towards to the center of the die 1 in the direction of the arrow.

Figure 5:
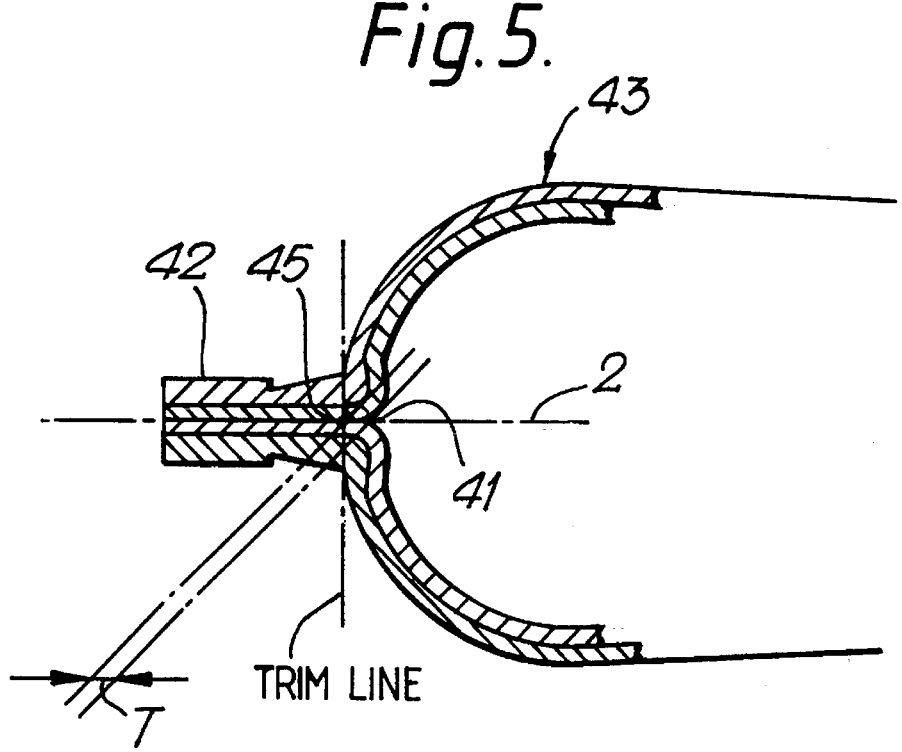
FIG. 5 shows a vertical section through part of a superplastically formed structure prior to flange trimming.
Figure 6:
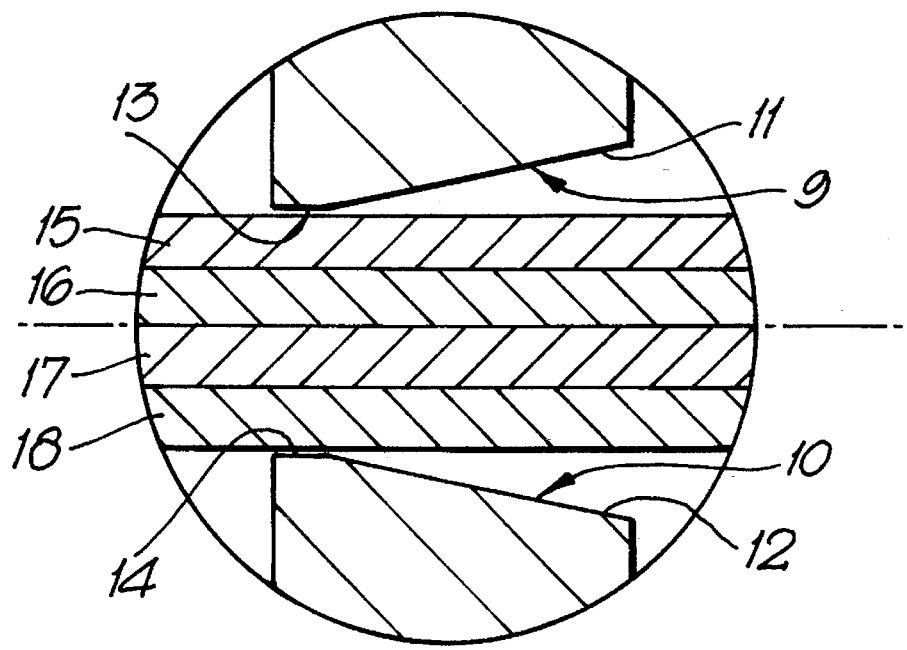
FIG. 6 shows the detail VI on FIG. 1.

Referring now to FIG. 5, it will be seen that the act of trimming a flange 42 from a fully formed structure 43 leaves a metal thickness "T" at the split line 2 measured between points 41 and 45. Without the metal having been upset forged as described above, this metal thickness can diminish to zero. In other words the upper and lower halves of the structure will separate when the flange is trimmed off. The upset forging of the metal as described above has effectively pushed point 41, i.e. the separation line, inwardly of the structure to create a greater thickness of metal at the split line 2.

Relatively thicker regions 19, 20, 24, 25 of the sheets enhance this process of moving the line of separation 41 inwardly of the structure but will not be necessary in every case.

We claim:

1. A method of forming a diffusion bonded joint during superplastic forming of a hollow metal structure from sheet material using a two piece die having opposed clenching faces disposed along a split line thereof, the structure being formed with a joint at the split line, the method including the steps of:

placing at least two metal sheets between the faces;

clenching the sheets with a pressure sufficient to locate the sheets during superplastic forming thereof but insufficient to deform the metal sheets so as to significantly restrict superplastic flow in the sheets between the clenching faces;

heating the sheets to a temperature to allow superplastic forming and diffusion bonding to take place;

applying a gas pressure between the sheets whereby to commence superplastic forming thereof to the shape of the die;

upon substantial cessation of superplastic metal flow between the clenching faces, increasing the pressure on the sheets via the clenching faces to upset forge metal from between the faces in a direction toward the interior of the die and create a greater thickness of metal at the split line;

in which the increase in pressure on the sheets is applied when sheets which come into direct contact with the internal die surfaces have first contacted the internal die surfaces in the region of the split line, before superplastic forming is complete.

2. A method of forming a diffusion bonded joint during superplastic forming of a hollow metal structure from sheet material using a two piece die having opposed clenching faces disposed along a split line thereof, the structure being formed with a joint at the split line, the method including the steps of:

placing at least two metal sheets between the faces;

clenching the sheets with a pressure sufficient to locate the sheets during superplastic forming thereof but insufficient to deform the metal sheets so as to significantly restrict superplastic flow in the sheets between the clenching faces;

heating the sheets to a temperature to allow superplastic forming and diffusion bonding to take place;

applying a gas pressure between the sheets whereby to commence superplastic forming thereof to the shape of the die;

upon substantial cessation of superplastic metal flow between the clenching faces, increasing the pressure on the sheets via the clenching faces to upset forge metal from between the faces in a direction toward the interior of the die and create a greater thickness of metal at the split line;

in which the step of placing at least two sheets between the clenching faces comprises so placing at least four sheets and in which two outer sheets thereof are superplastically formed into direct contact with internal surfaces of the die and at least two inner sheets are superplastically formed into a core of the metal structure;

in which, when four sheets are being superplastically formed, the increase in pressure on the sheets is applied when the two outer sheets have substantially completed superplastic deformation to the shape of the die, and before superplastic formation of the two inner sheets is complete.

3. A method as in claim 2 in which, during the step of placing at least two metal sheets to be formed between the clenching faces of the die, at least one of the sheets placed comprises a relatively thicker region in the vicinity of the clenching faces and at least one relatively thinner region elsewhere.

4. A method as in claim 1 in which the step of placing at least two sheets between the clenching faces comprises so placing at least four sheets and in which two outer sheets thereof are superplastically formed into direct contact with internal surfaces of the die and at least two inner sheets are superplastically formed into a core of the metal structure.

5. A method as in claim 1 in which the step of increasing the pressure on the sheets via the clenching faces to upset forge the metal comprises bringing the clenching faces closer together until limit stops are reached.

6. A method as in claim 1 in which the upset forging step is carried out by bringing together said clenching faces at least one of which has at least a portion thereof tapered away from the other in the direction of the die interior.

7. A method as in claim 1 in which, during the step of placing at least two metal sheets to be formed between the clenching faces of the die, at least one of the sheets placed comprises a relatively thicker region in the vicinity of the clenching faces and at least one relatively thinner region elsewhere.

\* \* \* \* \*